US007372980B2

(12) United States Patent
Koide et al.

(10) Patent No.: US 7,372,980 B2
(45) Date of Patent: May 13, 2008

(54) INFORMATION TERMINAL APPARATUS WITH COLLATION FUNCTION

(75) Inventors: Wataru Koide, Yokohama (JP); Izuru Kiyokawa, Machida (JP); Takahiro Shimizu, Kamiina-gun (JP)

(73) Assignee: Olympus Corporation, Tokyo (JP)

( * ) Notice: Subject to any disclaimer, the term of this patent is extended or adjusted under 35 U.S.C. 154(b) by 728 days.

(21) Appl. No.: 10/801,338

(22) Filed: Mar. 15, 2004

(65) Prior Publication Data

US 2004/0205351 A1  Oct. 14, 2004

(30) Foreign Application Priority Data

Mar. 20, 2003  (JP)  ............... 2003-078519

(51) Int. Cl.
*G06K 9/00* (2006.01)
(52) U.S. Cl. ....................... 382/116; 382/124
(58) Field of Classification Search ............... None
See application file for complete search history.

(56) References Cited

U.S. PATENT DOCUMENTS 6,033,130 A * 3/2000 Muroi et al. ............ 396/448
6,065,076 A * 5/2000 Sorenson ................. 710/72
6,668,071 B1 * 12/2003 Minkin et al. ............ 382/124
2002/0094201 A1 * 7/2002 Lu .......................... 396/72
2003/0044090 A1 * 3/2003 Miyashita et al. ......... 382/313
2003/0109214 A1 * 6/2003 Yamashiro ................ 454/165

FOREIGN PATENT DOCUMENTS

JP    11-185016 A     7/1999
JP    2001-084062 A   3/2001

* cited by examiner

*Primary Examiner*—Brian Werner
*Assistant Examiner*—Thomas M Redding
(74) *Attorney, Agent, or Firm*—Frishauf, Holtz, Goodman & Chick, P.C.

(57) ABSTRACT

According to this invention, a fingerprint sensor is mounted for fingerprint collation, and a movable protection unit which coverts the fingerprint sensor is arranged. In fingerprint authentication, the protection unit moves to expose the fingerprint sensor. Along with movement, the apparatus is powered on and activated, and the fingerprint sensor also operates to perform collation processing. The protection unit which covers the fingerprint sensor in normal use is formed by a member capable of handwriting input. This arrangement provides an information terminal apparatus which has a collation function and enables handwriting input.

12 Claims, 12 Drawing Sheets

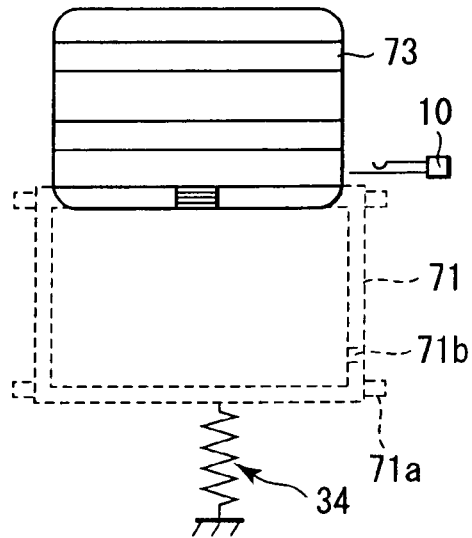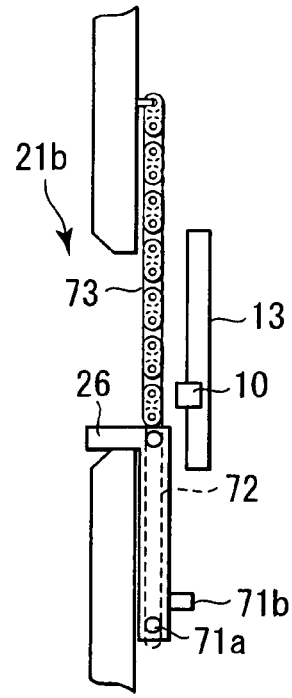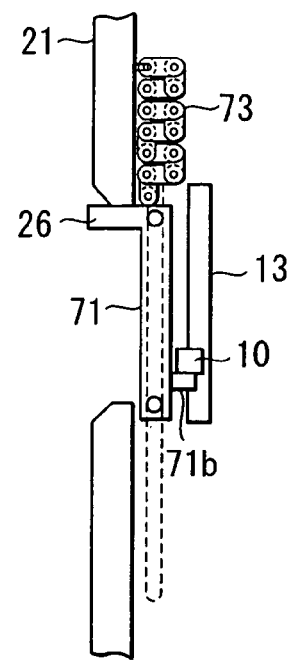
FIG. 12A  FIG. 12B  FIG. 12C
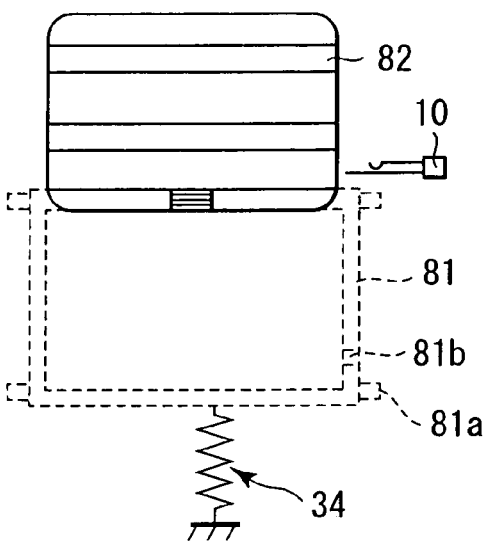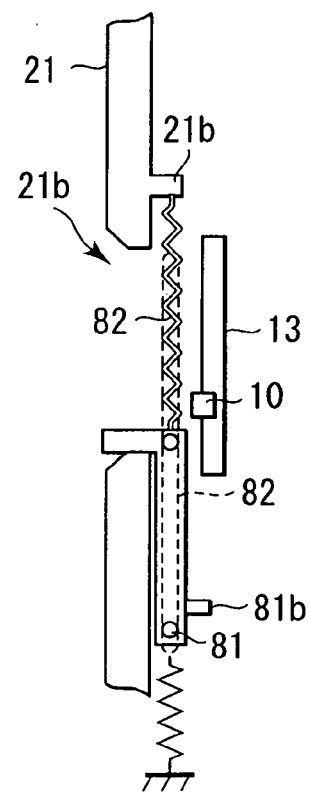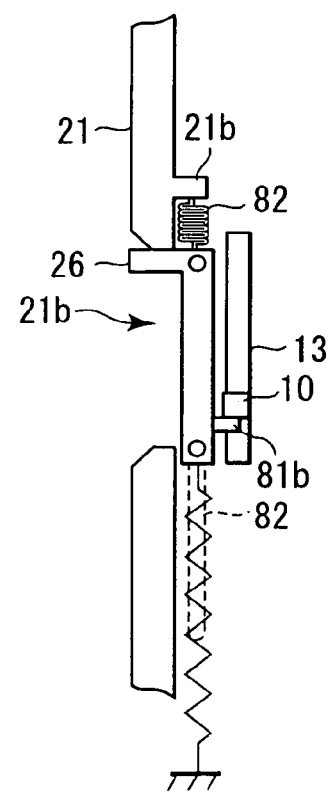
FIG. 13A  FIG. 13B  FIG. 13C

INFORMATION TERMINAL APPARATUS WITH COLLATION FUNCTION

CROSS-REFERENCE TO RELATED APPLICATIONS

This application is based upon and claims the benefit of priority from the Japanese Patent Application No. 2003-78519, filed Mar. 20, 2003, the entire contents of which are incorporated herein by references.

BACKGROUND OF THE INVENTION

1. Field of the Invention

The present invention relates to an information terminal apparatus having a collation function using a fingerprint sensor.

2. Description of the Related Art

Information devices (e.g., a computer), communication devices, and the like generally incorporate various security systems for excluding an outsider. For example, collation using an ID (IDentity) number or ID card is done. When the user is authenticated, the apparatus is activated to perform processing work by various application software programs or allow access to a network.

In addition to the ID number, collation operation sometimes utilizes a fingerprint, as disclosed in, e.g., the Jpn. Pat. Appln. KOKAI Publication Nos. 11-185016, 2001-084062. The fingerprint of a user's finger is registered in advance. At the start of operation, the fingerprint of a user is identified, and if the user is a registrant, the subsequent operation is permitted. A general device for detecting a fingerprint is a pressure sensitive or electrostatic fingerprint sensor.

Various security measures have also been examined in portable information terminal apparatuses. Most portable information terminal apparatuses perform software collation processing by causing the user to input an ID number or keyword in activating the apparatus, and determine whether collation is successful.

BRIEF SUMMARY OF THE INVENTION

The present invention provides an information terminal apparatus having a collation function, comprising an information input unit which has a detection surface exposed outside the apparatus, reads a fingerprint that touches the detection surface, and generates fingerprint data, a control unit which collates fingerprint data input from the information input unit and permits operation of the apparatus, a protection unit which can move to a position where the detection surface of the information input unit is covered and a position where the detection surface is exposed, and a moving mechanism which biases the protection unit to a covering position of the information input unit.

The present invention provides an information terminal apparatus having a collation function, comprising an information input unit which has a detection surface exposed outside the apparatus, reads a fingerprint that touches the detection surface, and generates fingerprint data, a control unit which collates fingerprint data input from the information input unit and permits operation of the apparatus, a protection unit which can move to a position where the detection surface of the information input unit is covered and a position where the detection surface is exposed, and has a film closely facing the detection surface, and a moving mechanism which biases the protection unit to a covering position of the information input unit, wherein a state in which fingerprint collation is performed on the detection surface when the protection unit moves to an exposure position and a state in which handwriting input is performed on the film when the protection unit is located at the covering position are switched.

The present invention provides an information terminal apparatus having a collation function, comprising an information input unit which has a detection surface exposed outside the apparatus, reads a fingerprint that touches the detection surface, and generates fingerprint data, a protection unit which can move to a position where the detection surface of the information input unit is covered and a position where the detection surface is exposed, a movement detection unit which detects that the protection unit has been moved to a covering position and an exposure position of the information input unit, and a control unit which activates the apparatus on the basis of a detection signal from the movement detection unit, wherein control in use is inhibited and interrupted to enable another control in synchronism with movement of the protection unit.

BRIEF DESCRIPTION OF THE SEVERAL VIEWS OF THE DRAWING

FIGS. 12A to 12C are views showing an example of the arrangements of a protection unit used for a fingerprint sensor and the moving mechanism of the protection unit in an information terminal apparatus according to the fifth embodiment;

FIGS. 13A to 13C are views showing an example of the arrangements of a protection unit used for a fingerprint sensor and the moving mechanism of the protection unit in an information terminal apparatus according to the sixth embodiment;

DETAILED DESCRIPTION OF THE INVENTION

Preferred embodiments of the present invention will be described in detail below with reference to the several views of the accompanying drawing.

Figure 1:
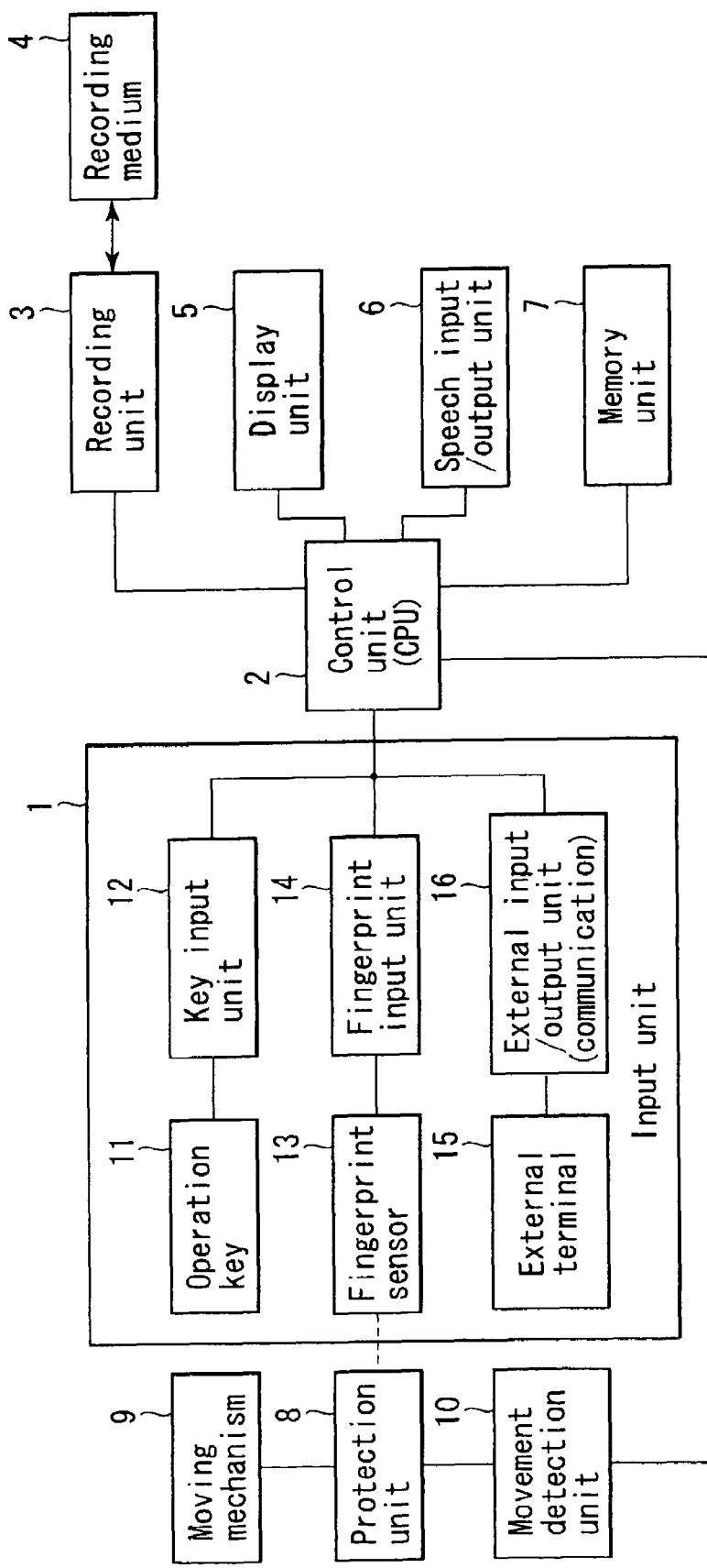
FIG. 1 is a block diagram showing the schematic block arrangement of an information terminal apparatus according to the present invention.

FIG. 1 shows the schematic block arrangement of an information terminal apparatus according to the present invention.

The information terminal apparatus comprises an input unit 1 (to be described later), a recording unit 3 which records various data (including fingerprint data) on a recording medium 4, a display unit 5 which is formed by a liquid crystal display panel (LCD) and the like and displays various pieces of information, images, and the like, a speech input/output unit 6 including a microphone and loudspeaker (neither is shown), a memory unit 7 which stores in advance a main program, application software, and the like, and a control unit 2 which is formed by a CPU and the like for performing control of the whole arrangement including these building components, collation (including permission of operation: to be described later) of fingerprint data input from the input unit 1, registration of fingerprint data, and the like. The recording medium 4 may be detachable of a card type or stick type in which data is stored by an electrical signal, light, or magnetic signal.

The input unit 1 is comprised of a key input unit 12, fingerprint input unit 14, and external input/output unit 16. Of these units, the key input unit 12 comprises a plurality of operation keys 11 arranged on the apparatus. The fingerprint input unit 14 has a fingerprint sensor 13 (information input), and inputs fingerprint data by touching the fingerprint input unit 14 with a finger. The external input/output unit 16 inputs/outputs information by external communication via an external terminal 15 by using RS232C or the like.

The fingerprint sensor 13 comprises a protection unit 8 (to be described in each of the following embodiments), a moving mechanism 9 which moves the protection unit 8, and a movement detection unit 10 which is formed by a switch for detecting movement of the protection unit 8 and outputting a detection signal to the control unit 2. The movement detection unit 10 has a power switch function of activating the information terminal apparatus. The apparatus is activated in the power-on state (ON state), and the fingerprint sensor 13 starts operation.

Figure 2:
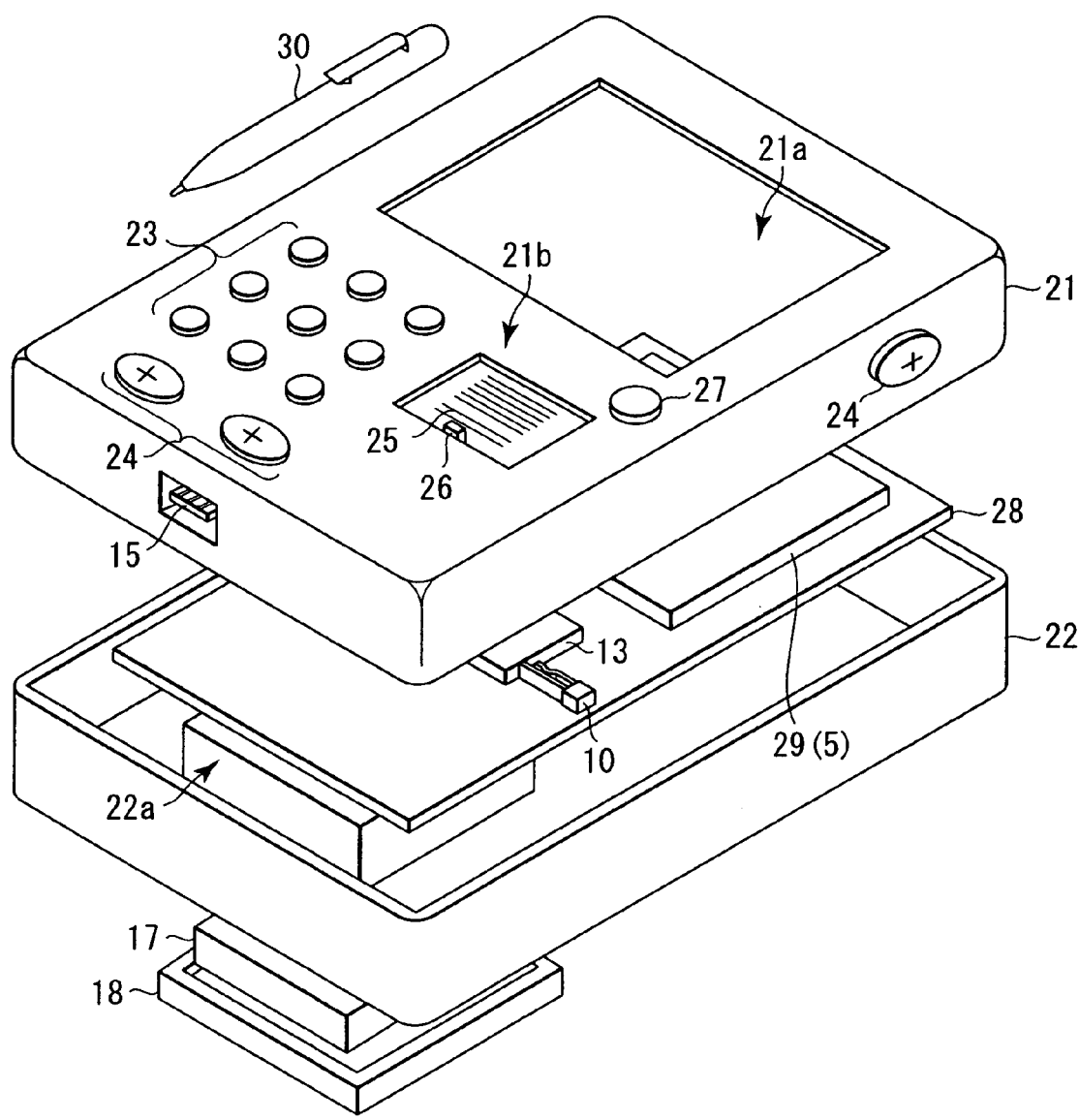
FIG. 2 is a perspective view showing the schematic arrangement of the overall information terminal apparatus according to the present invention.

FIG. 2 is a perspective view showing the schematic arrangement of the overall information terminal apparatus.

The information terminal apparatus is assembled by engaging an upper housing 21 and lower housing 22 which form a portable housing. A rubber packing (not shown) which makes the information terminal apparatus waterproof may be interposed between the peripheral engaging surfaces of the housings.

The upper housing 21 has a display window 21a for fitting the screen of a liquid crystal display panel (LCD), and the operation keys 11 are arranged on the upper housing 21. The operation keys 11 include a plurality of input keys 23, mode selection buttons 24 for selecting a mode and various functions, and a power switch 27.

The power switch 27 is a switch for activating/stopping the apparatus main body, and is used to stop the information terminal apparatus even when the apparatus is activated by the movement detection unit 10.

The upper housing 21 also comprises a protection cover 25 attached to a sensor window 21b formed for the fingerprint sensor 13 (to be described later), and a projection 26 for moving this cover. The lower housing 22 has a battery chamber 22a, a battery 17 is loaded in the chamber, and the battery chamber 22a is closed with a battery chamber lid 18. The upper and lower housings store a printed circuit board (PCB) 28. A liquid crystal display panel (LCD) 29 serving as the display unit 5 exposed from the display window 21a is mounted on the upper board surface of the PCB 28. A stylus 30 is used when a touch panel is mounted on the LCD 29.

In the information terminal apparatus according to the present invention, when the protection unit which covers the fingerprint sensor is moved for fingerprint collation, the apparatus is powered on and activated, and at the same time the fingerprint sensor is also activated. Collation processing by the fingerprint sensor is executed, and work can be immediately started. The fingerprint sensor is protected by the protection unit, and thus can be applied to an information terminal apparatus or the like which is often brought out. When the apparatus stops, the battery is not wastefully consumed because it is not consumed by the fingerprint sensor and the like. The information terminal apparatus according to the present invention is preferable for a Personal Digital Assistants (PDA) or cell phone.

Figure 3:
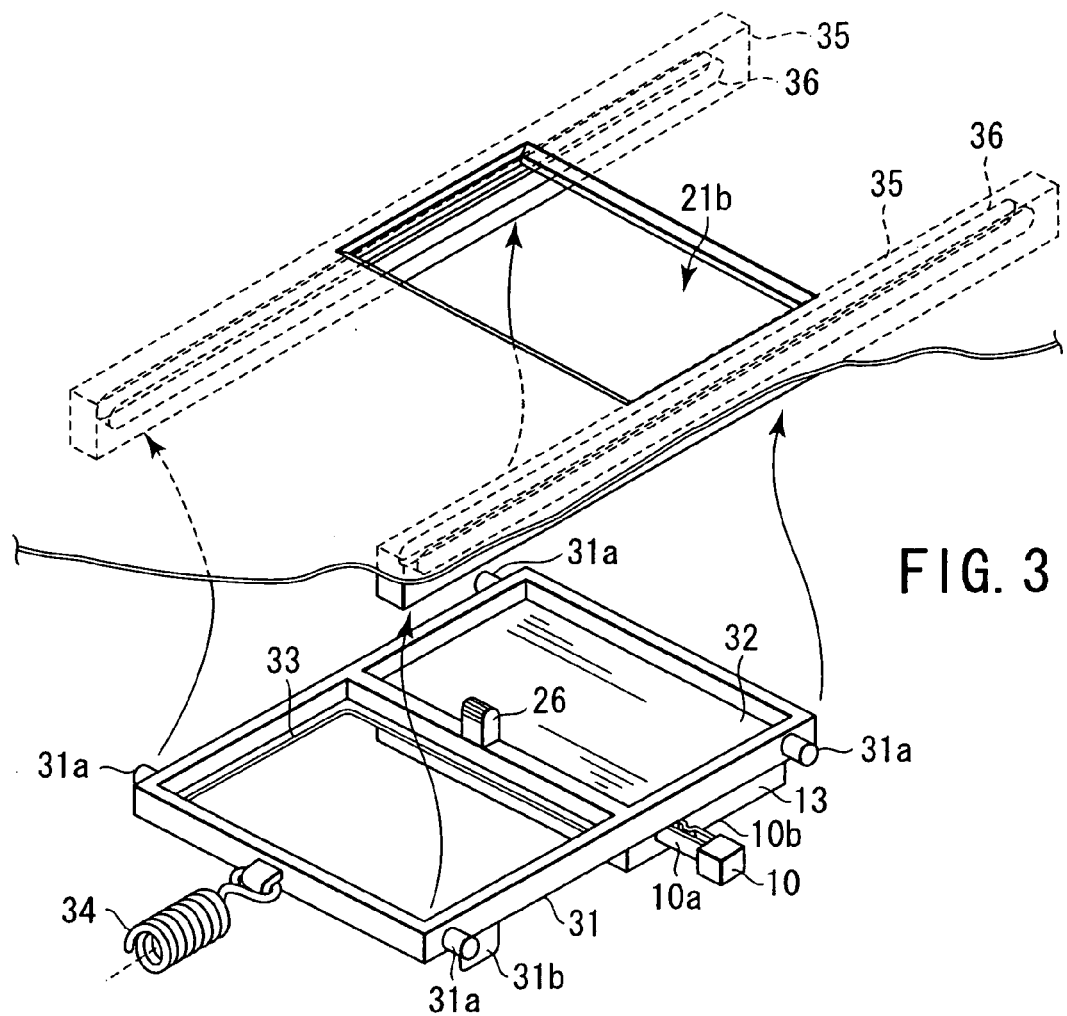
FIG. 3 is a perspective view showing an example of the arrangements of a protection unit used for a fingerprint sensor and the moving mechanism of the protection unit in the information terminal apparatus.
Figures 4A, 4B:
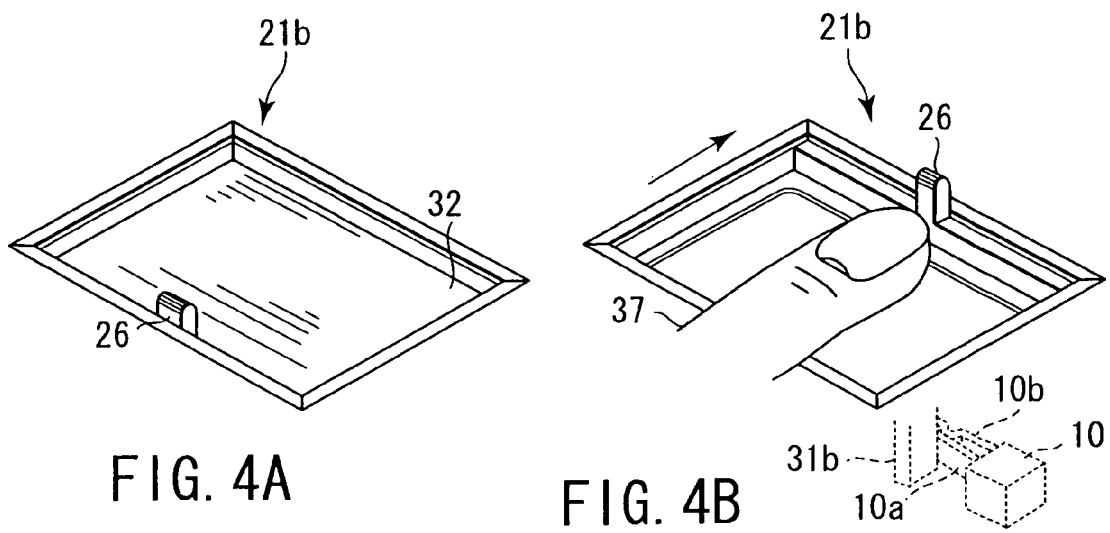
FIGS. 4A and 4B are views showing a protection state and fingerprint input state in the information terminal apparatus.

An information terminal apparatus capable of inputting a fingerprint will be explained as the first embodiment of the present invention. FIG. 3 shows an example of the arrangements of a protection unit used for a fingerprint sensor and the moving mechanism of the protection unit. FIGS. 4A and 4B are views showing a protection state and fingerprint input state. The apparatus main body according to the first embodiment is the same as the arrangement shown in FIGS. 1 and 2, and is a detailed arrangement example for the protection unit and moving mechanism.

In this arrangement, a rectangular moving frame 31 which forms a protection unit 8 is formed by two, protection and fingerprint frames. The protection frame has a protection cover 32 which covers the entire area within the frame with a thin plate of a resin (e.g., polycarbonate) or a metal (e.g., stainless steel). In the fingerprint frame, a frame cover 33 is attached to only the inner periphery of the frame, and a large opening is formed.

Guide bosses 31a are formed at the two ends of each long side of the moving frame 31. A switch boss 31b which is so pressed as to bring the contact pieces of a movement detection unit 10 (to be described later) into contact with each other is formed on the lower surface of the frame. A spring 34 (biasing means) which biases the moving frame 31 so as to return to an original state upon movement is attached to the short side of the fingerprint frame of the moving frame 31.

Two movement guides 35 are attached to the upper inner walls via a sensor window 21*b* formed in an upper housing 21. Slidable guide grooves 36 which fit on the guide bosses 31*a* of the protection frame 31 are formed in those surfaces of the movement guides 35 that face the sensor window 21*b*. The guide bosses 31*a* of the moving frame 31 are fitted in the guide grooves 36, and the moving frame 31 is fixed inside the upper housing 21 so as to bias the moving frame 31 by the spring 34 in the pulling direction. The spring 34 enables the protection cover 32 to automatically return to close the sensor window 21*b* by releasing the finger from the sensor surface.

A fingerprint sensor 13 mounted on a PCB 28 is arranged below the moving frame 31. The movement detection unit 10 is so arranged as to be pressed such that contact pieces 10*a* and 10*b* contact each other (are electrically connected) by the boss 31*b* at the position where the fingerprint sensor 13 is exposed when the moving frame 31 moves close to the fingerprint sensor 13.

FIG. 4A shows the normal (use or carried) state of the sensor window 21*b*. The sensor window 21*b* is closed by the protection cover 32 to protect the fingerprint sensor 13 (not shown). As shown in FIG. 4B, the user pushes a projection 26 with a finger 37 to move the moving frame 31, and touches the exposed fingerprint sensor 13 so as to read the fingerprint of the finger 37. At this time, the switch boss 31*b* presses the contact piece 10*a* of the movement detection unit 10 to bring the contact piece 10*a* into contact with the contact piece 10*b*. Accordingly, the information terminal apparatus is activated, and the fingerprint sensor 13 reads the fingerprint.

Figure 5:
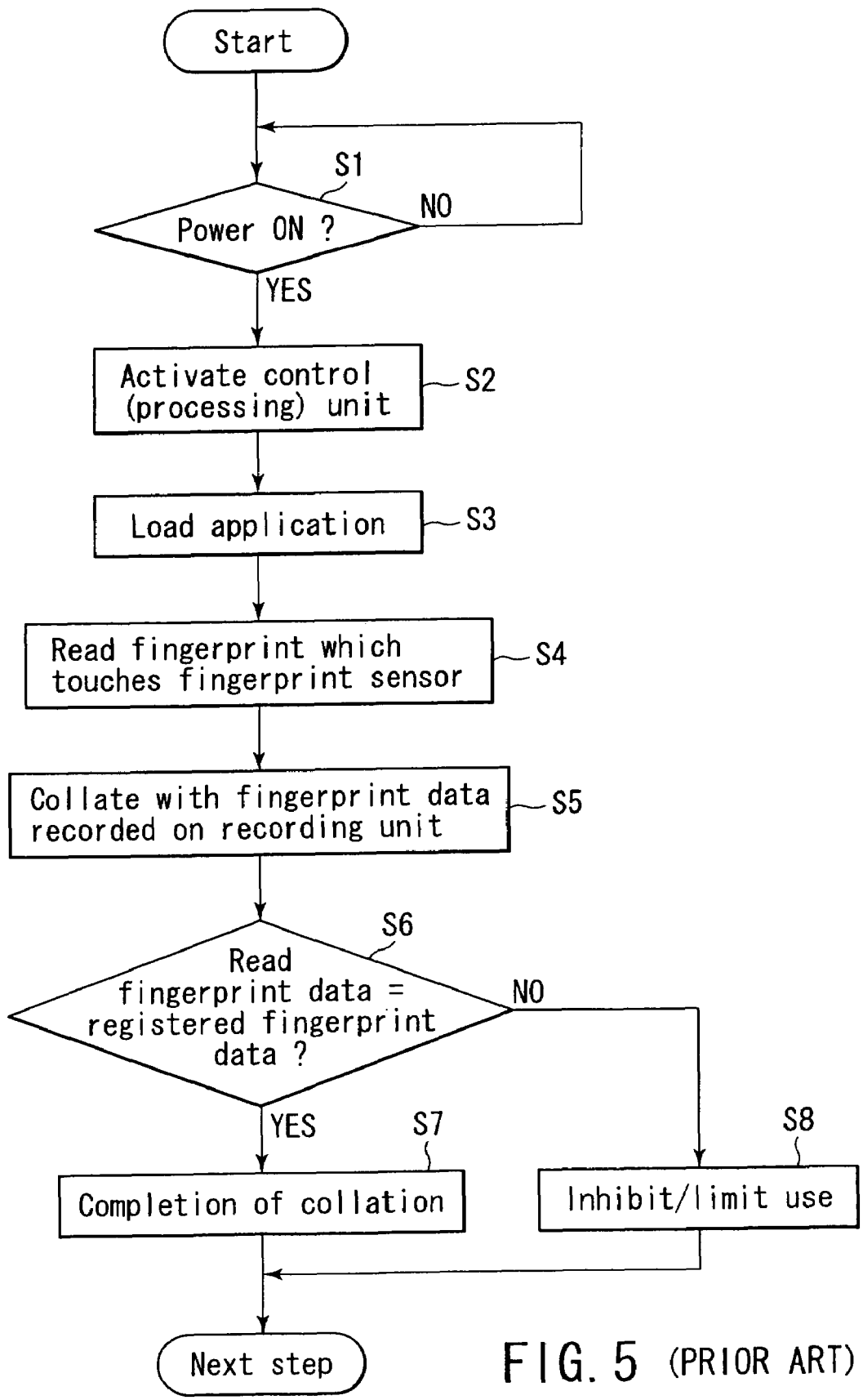
FIG. 5 is a flow chart for explaining conventional fingerprint collation for comparison.

Fingerprint collation in the information terminal apparatus according to the first embodiment will be explained with reference to the flow charts shown in FIGS. 6A and 6B. Before a description of the first embodiment, conventional fingerprint collation will be briefly explained with reference to the flow chart of FIG. 5 for comparison. Collation of a fingerprint which has already been registered will be exemplified When the apparatus is powered on, the control (processing) unit such as a CPU is activated and loads necessary applications (steps S1 to S3). The user's finger touches the fingerprint sensor to read the fingerprint (step S4). The read fingerprint data is collated with fingerprint data recorded on the recording unit (step S5), and whether the read fingerprint data is identical to the registered fingerprint data (or the same data is contained) is determined (step S6). If these fingerprint data are determined to be identical (YES), successful collation is confirmed, and the processing ends. After the end of processing, the apparatus can be used. If the read fingerprint data is determined not to be identical to the registered fingerprint data (or not to be contained) (NO), the use by the user is inhibited or limited (step S8).

To the contrary, fingerprint registration according to the first embodiment will be explained with reference to the flow chart shown in FIG. 6A.

As shown in FIG. 4B, the projection 26 is pushed with a finger to move the moving frame 31 from a state in which the information terminal apparatus shown in FIG. 4A is not driven. The finger touches the exposed fingerprint sensor so as to read the fingerprint. At this time, as described above, the boss 31*b* brings the contact pieces of the movement detection unit 10 into contact with each other, thereby activating the information terminal apparatus. Upon activation, the fingerprint sensor 13 operates to read the fingerprint of the contact finger (step S11). The read fingerprint data is collated with fingerprint data which have already been recorded in the memory unit 7 or on the recording medium 4, and whether the read fingerprint data coincides with any data is determined (steps S12 and S13). If no same fingerprint data exists (NO), processing of newly registering the read fingerprint data is done to enable the use of this fingerprint data in subsequent collation (step S14). Note that fingerprint data registration processing cannot be indiscriminately performed. For example, in initial setting immediately after purchase, registration processing is done using an ID or the like given by the manufacturer. This ID may be changed by the user.

If the read fingerprint has already been registered in step S14 (YES), collation is completed (step S15), and the flow shifts to the next work step.

Collation of a registered fingerprint will be explained with reference to the flow chart shown in FIG. 6B.

Similar to steps S11 to S13 described above, the projection 26 is pushed with a finger to touch the exposed fingerprint sensor. At this time, as described above, the boss 31*b* brings the contact pieces of the movement detection unit 10 into contact with each other, thereby activating the information terminal apparatus. Upon activation, the fingerprint sensor 13 operates to read the fingerprint of the contact finger (step S21). The read fingerprint data is collated with fingerprint data which have already been recorded in the memory unit 7 or on the recording medium 4 (step S22). If the same fingerprint data exists as a result of collation and has already been registered (YES), collation is completed (step S24), and the flow shifts to the next step. If the same fingerprint data as the read fingerprint data does not exist in recorded data (NO), the use by the user is inhibited or limited (step S25).

As described above, according to the first embodiment, the sensor window is closed by the protection cover unless fingerprint collation is done by the fingerprint sensor. This prevents any damage to the fingerprint sensor due to external shocks or the like. In order to perform fingerprint collation, the protection cover (moving frame) is moved. The movement detection unit functioning as a power switch is turned on, the information terminal apparatus is activated, and the fingerprint sensor can operate. Compared to conventional fingerprint collation work, the user need not operate the power switch, simplifying the operation necessary for fingerprint collation. By releasing the finger from the fingerprint sensor, the sensor window is automatically closed by the biasing force of the spring.

An information terminal apparatus capable of inputting a fingerprint will be explained as the second embodiment. FIGS. 7A to 7E show an example of the arrangements of a protection unit used for a fingerprint sensor and the moving mechanism of the protection unit. The apparatus main body according to the second embodiment is the same as the arrangement shown in FIGS. 1 and 2, and is a detailed arrangement example for the protection unit and moving mechanism.

Figure 7A:
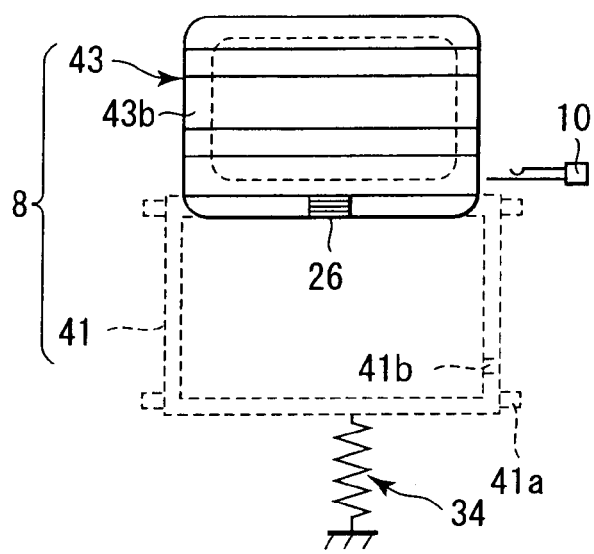
FIGS. 7A to 7E are views showing an example of the arrangements of a protection unit used for a fingerprint sensor and the moving mechanism of the protection unit in an information terminal apparatus according to the second embodiment.

As shown in FIG. 7A, a protection unit 8 is formed by a fingerprint frame 41 and slide type protection cover 43. The fingerprint frame 41 is identical to the fingerprint frame having the frame cover 33 described above. Guide bosses 41*a* attached to two sides are slidably fitted in guide grooves 42 formed within an upper housing 21, and a large opening is formed in the frame.

Figure 7B:
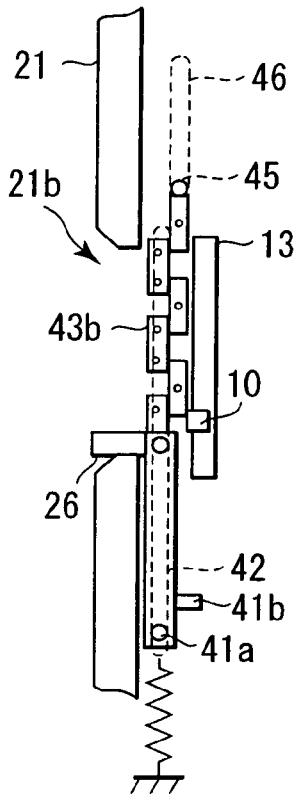

As shown in FIG. 7B, one end of the slide type protection cover 43 is coupled to the fingerprint frame 41. The other end is fitted in guide grooves 46, at the distal ends of which guide bosses 45 are so arranged as to sandwich the slide type protection cover 43 from two sides within the upper housing 21. The other end of the slide type protection cover 43 can therefore slide along the grooves. The slide type protection cover 43 is formed by a plurality of slide covers 43b of a resin (e.g., polycarbonate) or a metal (e.g., stainless steel).

Figure 7C:
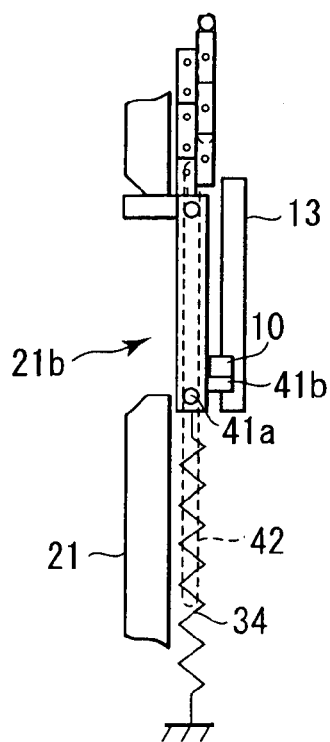

When the information terminal apparatus is normally used or carried, the slide type protection cover 43 is extended to close a sensor window 21b, as shown in FIG. 7B. In fingerprint collation, the slide type protection cover 43 is pushed with a finger (not shown) and moves, as shown in FIG. 7C. The fingerprint frame 41 comes to the position of the sensor window 21b, and the slide type protection cover 43 contracts to expose a fingerprint sensor 13.

Figure 7D:
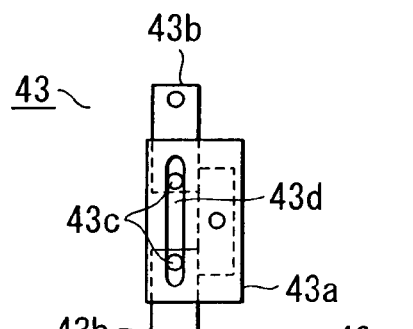

Extension and contraction are achieved because the slide covers 43b overlap in two layers, as shown in FIG. 7D. The upper (front side) slide cover 43b has two guide bosses 43c on each of two side surfaces. The guide bosses 43c of the two adjacent slide covers 43b are fitted in grooves 43d of side plates 43a fixed to the lower slide cover 43b.

Figure 7E:
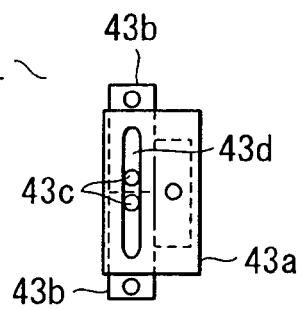

With this arrangement, when the slide type protection cover 43 closes the sensor window 21b, as shown in FIG. 7B, the cover 43 is extended, and the guide bosses 43c spread to the two ends of the groove 43d, as shown in FIG. 7D. When the fingerprint frame 41 moves to the sensor window 21b, the slide covers 43b come close to each other and contract along the groove 43d, as shown in FIG. 7E.

In fingerprint collation, the fingerprint frame 41 is pulled by a spring 34 so as to return to an original position, as shown in FIG. 7C. When the finger is released from the fingerprint sensor 13, the fingerprint frame 41 returns, and the slide type protection cover 43 is pulled out to close the sensor window 21b, as shown in FIG. 7B. Also in the second embodiment, a switch boss 41b which is so pressed as to turn on a movement detection unit 10 is formed on the lower surface of the fingerprint frame 41. The information terminal apparatus is activated by an ON signal from the movement detection unit 10, and the fingerprint sensor 13 operates.

The second embodiment can obtain the same effects as those of the first embodiment. In addition, the protection cover is extended/contracted, and the necessary space can be reduced upon contraction.

Figure 8A:
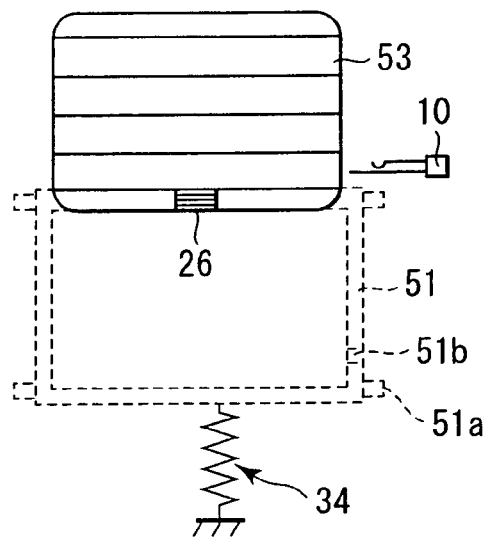
FIGS. 8A to 8C are views showing an example of the arrangements of a protection unit used for a fingerprint sensor and the moving mechanism of the protection unit in an information terminal apparatus according to the third embodiment.
Figure 8B:
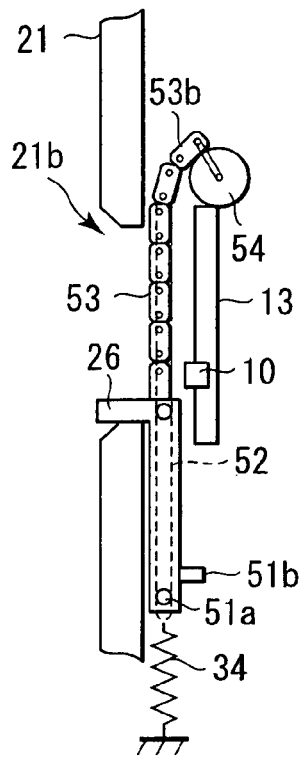
Figure 8C:
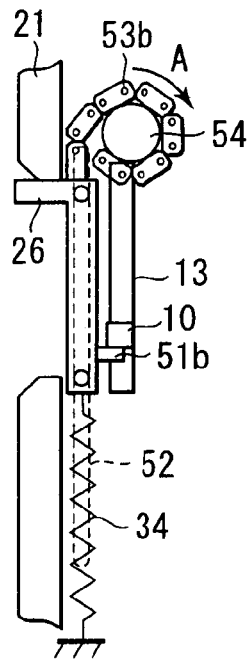

An information terminal apparatus capable of inputting a fingerprint will be explained as the third embodiment. FIGS. 8A to 8C show an example of the arrangements of a protection unit used for a fingerprint sensor and the moving mechanism of the protection unit. The apparatus main body according to the third embodiment is the same as the arrangement shown in FIGS. 1 and 2, and is a detailed arrangement example for the protection unit and moving mechanism.

As shown in FIG. 8A, a protection unit 8 is formed by a fingerprint frame 51 and shutter type protection cover 53. The fingerprint frame 51 is identical to the fingerprint frame described above. Guide bosses 51a attached to two sides are slidably fitted in guide grooves 52 formed within an upper housing 21, and a large opening is formed in the frame.

One end of the shutter type protection cover 53 is coupled to the fingerprint frame 51, and the other end is coupled to a take-up rotor 54. The take-up rotor 54 has in a direction A a rotation biasing force which is weaker than the biasing force of a pullback spring 34 attached to the fingerprint frame 41 and is so strong as to make the taken-up shutter cover 53 in tight contact. The shutter type protection cover 53 is constituted by coupling a plurality of shutter covers 53b of a resin (e.g., polycarbonate) or a metal (e.g., stainless steel).

When the information terminal apparatus is normally used or carried, the shutter type protection cover 53 closes a sensor window 21b, as shown in FIG. 8B. In fingerprint collation, the shutter type protection cover 53 is pushed with a finger (not shown) and moves, as shown in FIG. 8C. The fingerprint frame 51 comes to the position of the sensor window 21b, and the shutter type protection cover 53 is taken up by the take-up rotor 54 to expose a fingerprint sensor 13.

The third embodiment can obtain the same effects as those of the first embodiment. Since the protection cover is taken up, the space necessary to store the protection cover in fingerprint collation can be reduced.

Figure 9A:
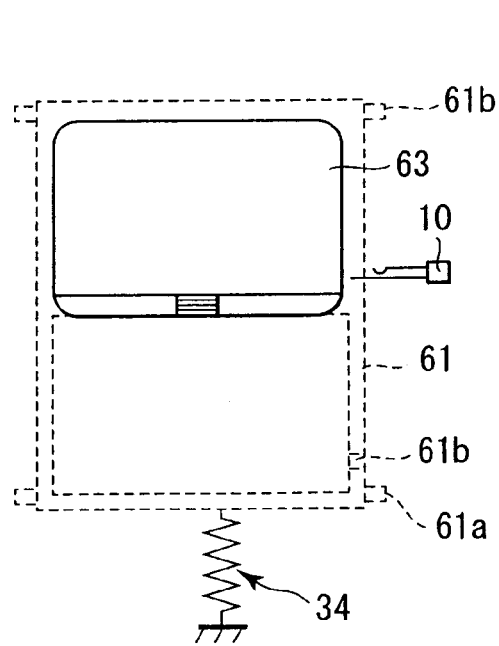
FIGS. 9A to 9C are views showing an example of the arrangements of a protection unit used for a fingerprint sensor and the moving mechanism of the protection unit in an information terminal apparatus according to the fourth embodiment.
Figure 9B:
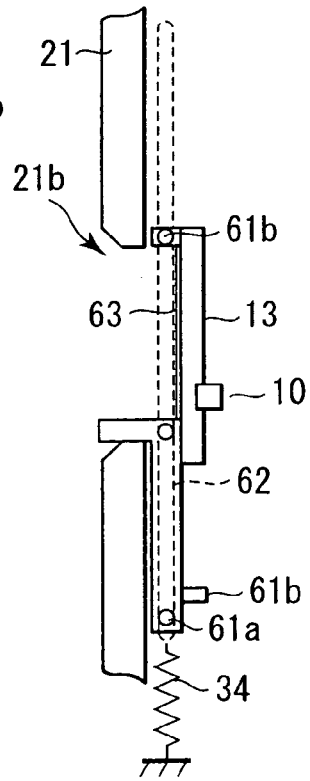
Figure 9C:
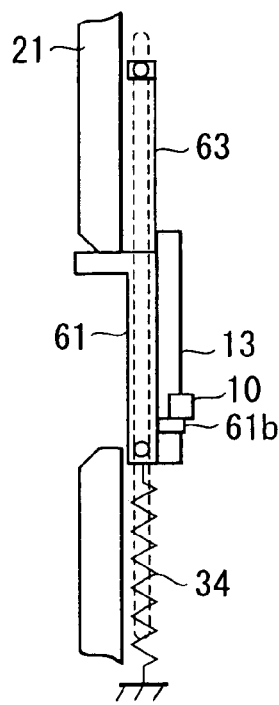
Figure 10:
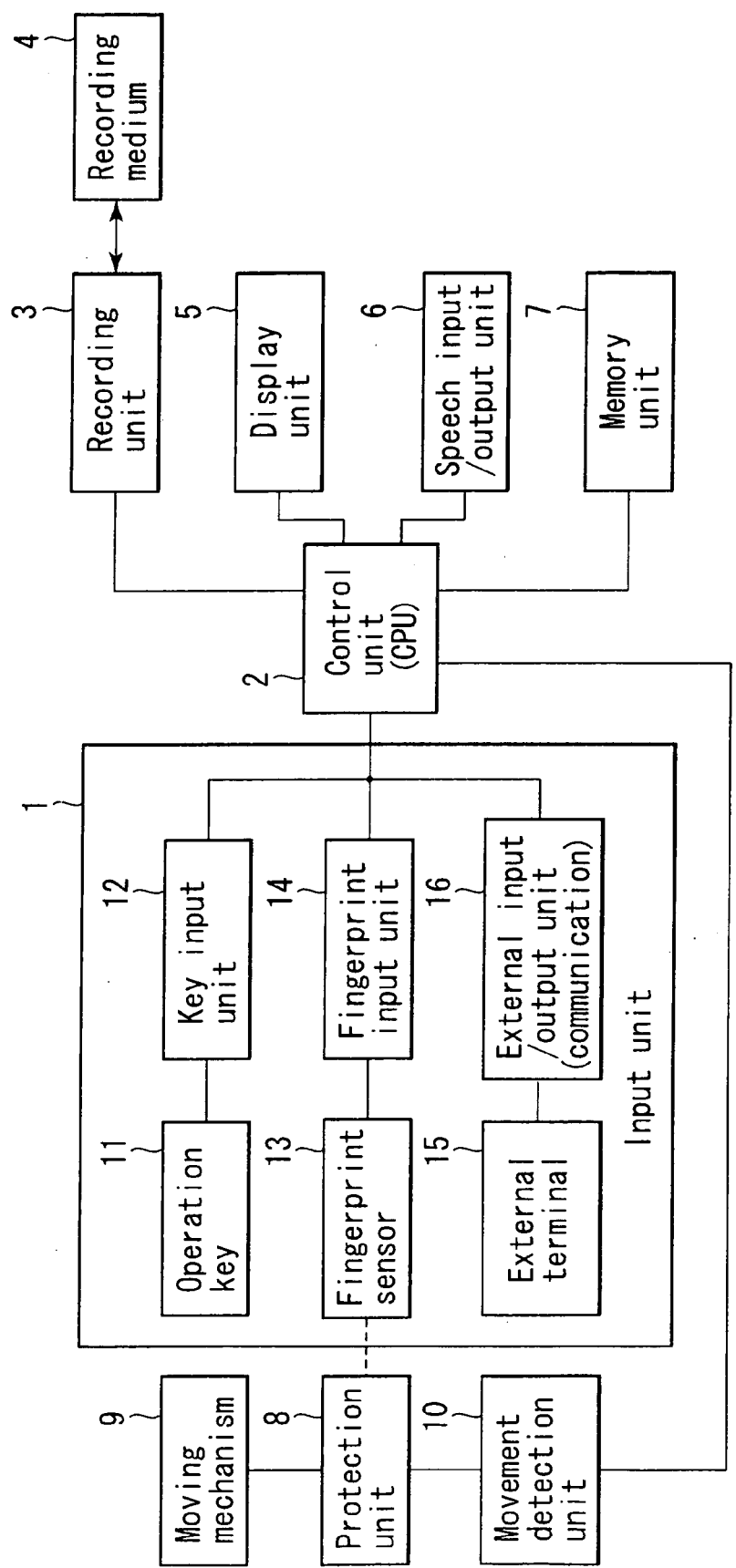
FIG. 10 is a block diagram showing the schematic block arrangement of the information terminal apparatus according to the fourth embodiment.
Figure 11A:
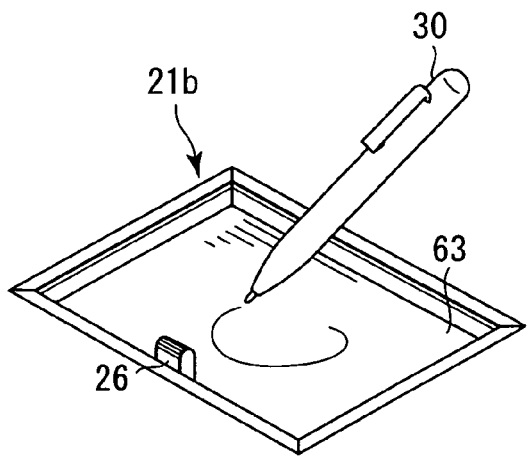
FIGS. 11A and 11B are views showing a protection state and fingerprint input state in the information terminal apparatus according to the fourth embodiment.
Figure 11B:
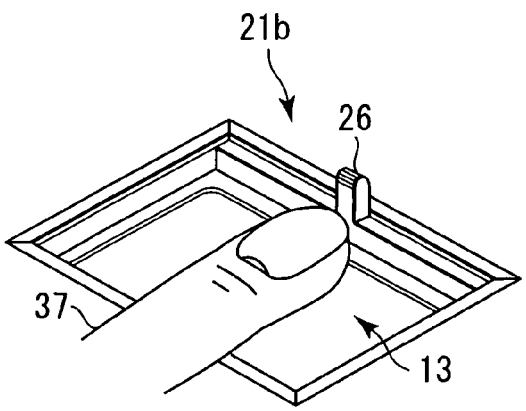

An information terminal apparatus capable of inputting a fingerprint and handwriting data will be explained as the fourth embodiment. FIGS. 9A to 9C show an example of the arrangements of a protection unit used for a fingerprint sensor and the moving mechanism of the protection unit. FIG. 10 shows the schematic block arrangement of the information terminal apparatus according to the fourth embodiment. FIGS. 11A and 11B are views showing a protection & handwriting input state and a fingerprint input state. In the arrangement shown in FIG. 10, the same reference numerals as in FIG. 1 denote the same parts, and a detailed description thereof will be omitted.

In the information terminal apparatus according to the fourth embodiment, a pressure sensitive fingerprint sensor is constituted by substantially the same principle as that of a press touch panel. The fingerprint sensor is also used for handwriting input, similar to the touch panel.

The fourth embodiment is different from the arrangement shown in FIG. 1 in a protection unit 8 and fingerprint/handwriting input unit 60. The fingerprint/handwriting input unit determines a character, figure, or the like drawn on a fingerprint sensor 13 by a stylus 30, converts the input into a corresponding electrical signal or code number, and outputs the signal to a control unit 2. The control unit 2 performs predetermined processing or displays the input on a display unit 5 on the basis of the received signal. The position (coordinates) on the surface of the fingerprint sensor is correlated with a position on the screen of the display unit 5. The drawing on the fingerprint sensor can be directly displayed on the screen of the display unit 5.

FIGS. 9A to 9C show an example of the arrangements of a protection unit used for the fingerprint sensor and the moving mechanism of the protection unit.

As shown in FIG. 9A, a rectangular moving frame 61 which forms the protection unit 8 is formed by two frames: a fingerprint frame and a protection cover frame capable of handwriting input. The fingerprint frame is identical to the fingerprint frame shown in FIG. 3. A protection cover 63 is formed by a film of polyester or the like, instead of the protection cover 32 of polycarbonate or a stainless steel thin plate in FIG. 3. The film is so thick as to sense the pressure of handwriting with the stylus or the like and prevent external shocks (external force). The remaining arrangement is the same as that shown in FIG. 3.

FIG. 11A shows the normal (use or carried) state of a sensor window 21b. The sensor window 21b is closed by the protection cover 63 capable of handwriting input, thereby protecting the fingerprint sensor 13 (not shown). The user can handwrite and input a character, figure, or the like by using the stylus 30 or the like. As shown in FIG. 11B, the user pushes a projection with a finger 37 to move the moving frame 61, and touches the exposed fingerprint sensor 13 so as to read the fingerprint of the finger. At this time, a switch boss 61b presses the contact pieces of a movement detection unit 10 to turn on the movement detection unit 10, activating the information terminal apparatus. Also in the fourth embodiment, a spring 34 is arranged and biases the moving frame 61 so as to return to an original state (normal state).

The fourth embodiment described above enables handwriting input in a state in which the fingerprint sensor is protected. This embodiment can execute the same input processing (selection of a mode or numerical value, input of a character or figure, and the like) as that of a case in which a touch panel is mounted on the display screen. Only by moving the protection cover frame for fingerprint collation, the information terminal apparatus can be activated to perform collation processing.

An information terminal apparatus capable of inputting a fingerprint will be described as the fifth embodiment. FIGS. 12A to 12C show an example of the arrangements of a protection unit used for a fingerprint sensor and the moving mechanism of the protection unit. The apparatus main body according to the fifth embodiment is the same as the arrangement shown in FIGS. 1 and 2, and is a detailed arrangement example for the protection unit and moving mechanism.

As shown in FIG. 12A, a protection unit 8 is formed by a fingerprint frame 71 and chain type protection cover 73. The fingerprint frame 71 is identical to the fingerprint frame described above. Guide bosses 71a attached to two sides are slidably fitted in guide grooves 72 formed within an upper housing 21, and a large opening is formed in the frame.

The chain type protection cover 73 is constituted by coupling a plurality of chain blocks 73b with a large width. One end of the chain type protection cover 73 is coupled to the fingerprint frame 71, and the other end is fixed to the upper wall inside the upper housing 21. These chain blocks 73b are formed by a resin (e.g., polycarbonate) or a metal (e.g., stainless steel). These materials may be combined such that the link portion is formed by polycarbonate and the bush serving as a coupling portion is formed by stainless steel.

When the information terminal apparatus is normally used or carried, the chain type protection cover 73 is stretched flat to close a sensor window 21b, as shown in FIG. 12B. In fingerprint collation, a projection 26 is pushed with a finger (not shown), and the fingerprint frame 71 comes to the position of the sensor window 21b, as shown in FIG. 12C. The chain type protection cover 73 is so stored as to fold the chain blocks 73b. Guides may also be formed on the two sides of the sensor window 21b so as not to flex the chain type protection cover 73 inward when the cover 73 is stretched flat.

The fifth embodiment can obtain the same effects as those of the first embodiment. Since the protection cover is folded upon storage, the space necessary to store the protection cover in fingerprint collation can be reduced.

An information terminal apparatus capable of inputting a fingerprint will be described as the sixth embodiment. FIGS. 13A to 13C show an example of the arrangements of a protection unit used for a fingerprint sensor and the moving mechanism of the protection unit. The apparatus main body according to the sixth embodiment is the same as the arrangement shown in FIGS. 1 and 2, and is a detailed arrangement example for the protection unit and moving mechanism.

As shown in FIG. 13A, a protection unit 8 is comprised of a fingerprint frame 81 and bellows type protection cover 82. The fingerprint frame 81 is identical to the fingerprint frame described above. Guide bosses 81a attached to two sides are slidably fitted in guide grooves 82 formed within an upper housing 21, and a large opening is formed in the frame.

One end of the bellows type protection cover 82 is coupled to the fingerprint frame 81, and the other end is fixed to the upper wall inside the upper housing 21. The bellows type protection cover 82 is formed by a resin (e.g., polycarbonate).

When the information terminal apparatus is normally used or carried, the bellows type protection cover 82 is extended to close a sensor window 21b, as shown in FIG. 13B. In fingerprint collation, the bellows type protection cover 82 is pushed with a finger (not shown) and moves, as shown in FIG. 13C. The fingerprint frame 81 comes to the position of the sensor window 21b, and the bellows type protection cover 82 folds itself and is stored within the upper housing 21, exposing a fingerprint sensor 13.

The sixth embodiment can obtain the same effects as those of the first embodiment. Further, the protection cover is folded for storage, and the space necessary to store the protection cover in fingerprint collation can be reduced.

Figure 14A:
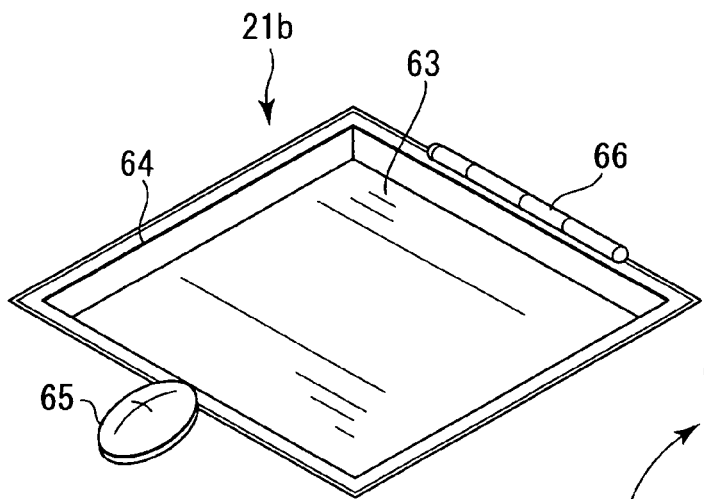
FIGS. 14A and 14B are views showing an example of the arrangements of a protection unit used for a fingerprint sensor and the moving mechanism of the protection unit in an information terminal apparatus according to the seventh embodiment.
Figure 14B:
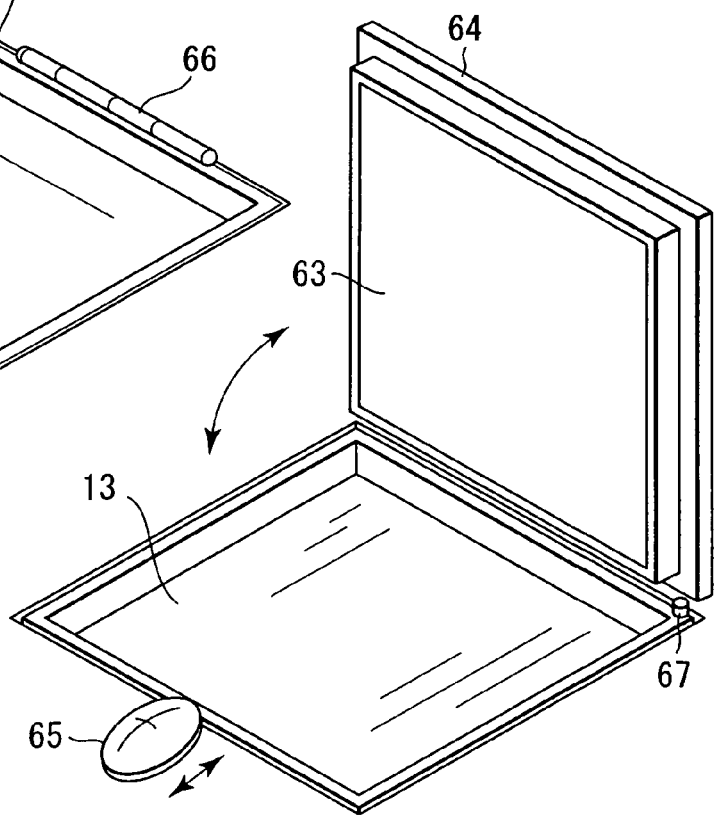

An information terminal apparatus capable of inputting a fingerprint will be described as the seventh embodiment. FIGS. 14A and 14B show an example of the arrangements of a protection unit used for a fingerprint sensor and the moving mechanism of the protection unit. The apparatus main body according to the seventh embodiment is the same as the arrangement shown in FIGS. 1 and 2, and is a detailed modification example for the protection unit and moving mechanism.

FIG. 14A shows the normal (use or carried) state of a sensor window. FIG. 14B shows a state in which the fingerprint sensor is exposed in fingerprint collation. In the protection unit shown in FIG. 14A, a protection cover 63 identical to that in the fourth embodiment is adhered to a movable frame 64. The protection cover 63 is a film of polyester or the like. The protection cover 63 is so thick as to sense the pressure of handwriting with the stylus or the like and prevent external shocks (external force). When the protection cover 63 is used only for protection, the cover 63 may also be formed of polycarbonate or stainless steel, similar to other embodiments.

The movable frame 64 is pivotally fixed by a hinge 66 to one side of a sensor window 21b formed in an upper housing 21, and is biased by a spring (not shown) so as to be opened. A slidable opening/closing button 65 is arranged such that its end overlaps one side of the sensor window 21b. The opening/closing button 65 functions as the stopper of the movable frame 64.

As shown in FIG. 14B, the opening/closing button 65 slides to disengage the movable frame 64, and the movable frame 64 is opened by the spring (not shown). A switch 67 is arranged at the edge of the sensor window 21b that contacts the movable frame 64 when the movable frame 64 is closed. The switch 67 can be used as the above-described movement detection unit 10. By opening the movable frame 64, the detection surface of a fingerprint sensor 13 is exposed.

As described above, the protection cover which covers the entire area within the frame of the movable frame 64 can adopt two protection covers: a protection cover which is formed of polycarbonate or a metal thin plate, targets only protection, and cannot input handwriting data, and a protection cover which is formed from a film of polyester or the like and can input handwriting data.

The seventh embodiment can obtain the same effects as those of the first embodiment. In addition, handwriting input can be done while the protection unit is closed. The seventh embodiment is preferable for a structure in which the protection unit cannot be stored in the upper housing.

In the above-described embodiments, fingerprint collation is performed in an OFF (power-off) information terminal apparatus. Some information terminal apparatuses incorporate application software which runs without any fingerprint collation. When the information terminal apparatus has already operated (is powered on) without any fingerprint collation and application software requiring fingerprint collation is to be used, fingerprint collation must be executed as an interrupt.

Fingerprint collation in the operating information terminal apparatus will be explained with reference to the flow chart shown in FIG. 15 and FIG. 3. In a description of steps, the same step numerals denote the same steps as those described in FIG. 6A, and a detailed description thereof will be omitted.

When the information terminal apparatus operates in accordance with application software which runs without any fingerprint collation, the projection 26 is moved to expose the fingerprint sensor 13. The movement detection unit 10 whose contact pieces are pressed by the switch boss 31b detects that collation operation has been designated (step S31). Whether the power is ON is determined (step S32). If the power is ON (YES), the running application software is interrupted, the application software of the fingerprint sensor is loaded, and the processing shifts to the fingerprint collation mode (step S34).

Subsequently, the processing shifts to step S11 in FIG. 6A. More specifically, the fingerprint of the finger which touches the fingerprint sensor 13 is read. The read fingerprint data is collated with fingerprint data which have already been recorded, and whether the same data exists is determined (steps S11, S12, and S13). If no same fingerprint data is determined to exist (NO), the read fingerprint data is newly registered for collation (step S14). If the same fingerprint data exists and has already been registered (YES), collation is completed (step S15), and the processing returns to the original application software or shifts to the next work step.

Figure 16:
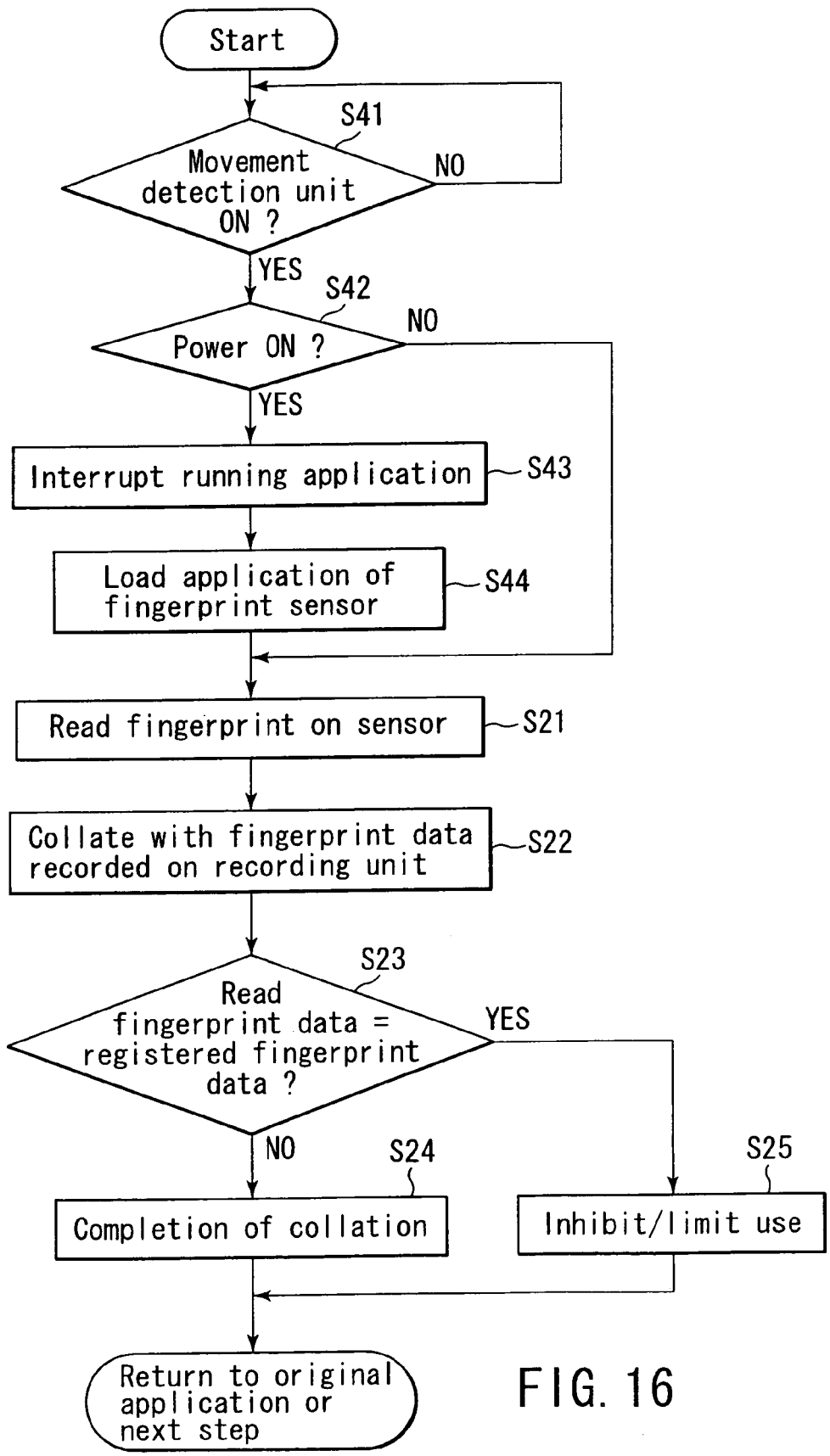
FIG. 16 is a flow chart for explaining fingerprint collation for a registered fingerprint in the operating information terminal apparatus according to the present invention.

Fingerprint collation for a registered fingerprint will be explained with reference to the flow chart shown in FIG. 16. In a description of steps, the same step numerals denote the same steps as those described in FIG. 6B, and a detailed description thereof will be omitted.

Figure 15:
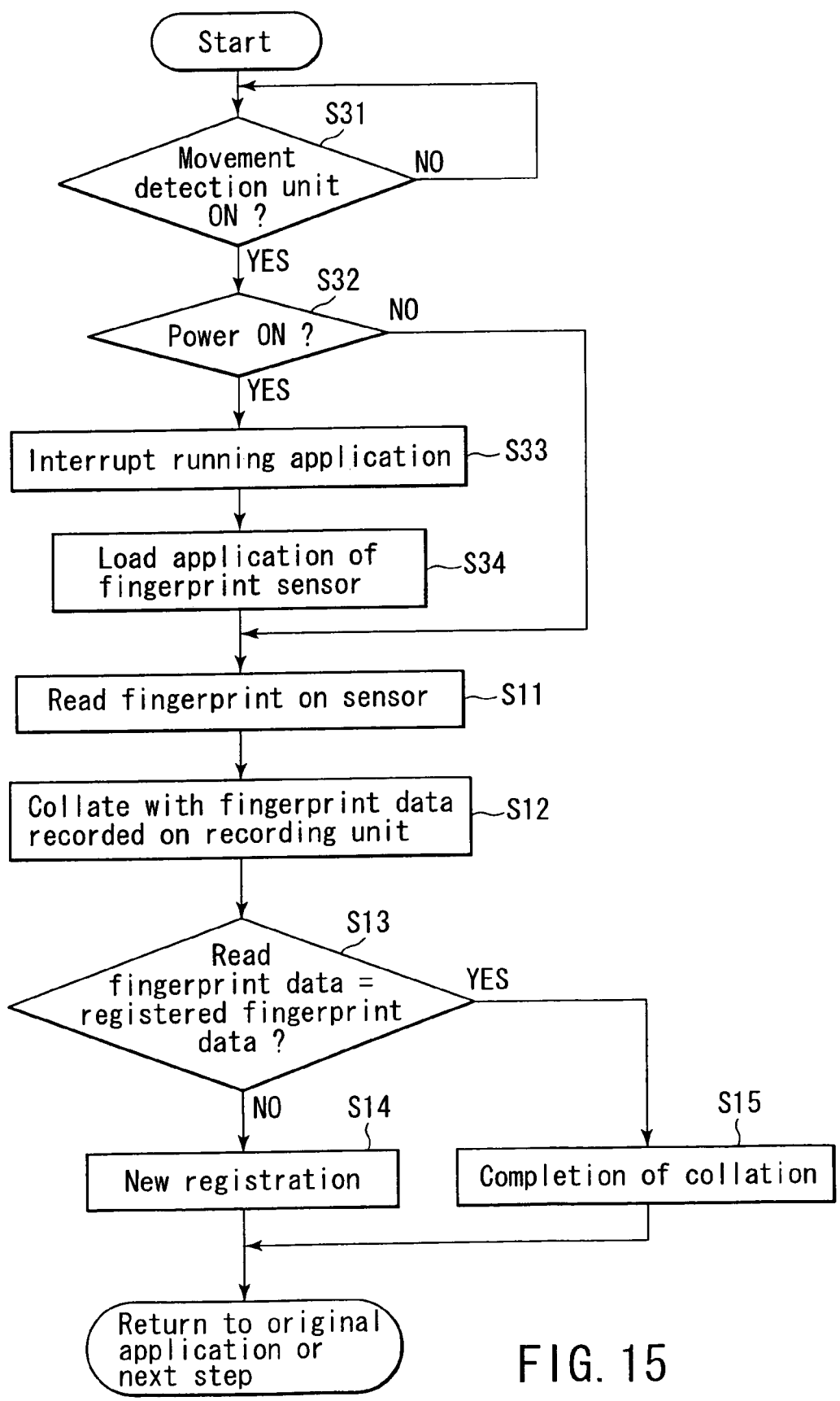
FIG. 15 is a flow chart for explaining fingerprint collation in the operating information terminal apparatus according to the present invention.

Similar to the description of FIG. 15, when the information terminal apparatus operates in accordance with application software which runs without any fingerprint collation, the projection 26 is moved to expose the fingerprint sensor 13. The movement detection unit 10 detects that the fingerprint sensor 13 has been exposed, and whether the power is ON is determined (steps S41 and S42). If the power is ON (YES), the running application software is interrupted, and the processing shifts to the fingerprint collation mode (steps S43 and S44).

Figure 6B:
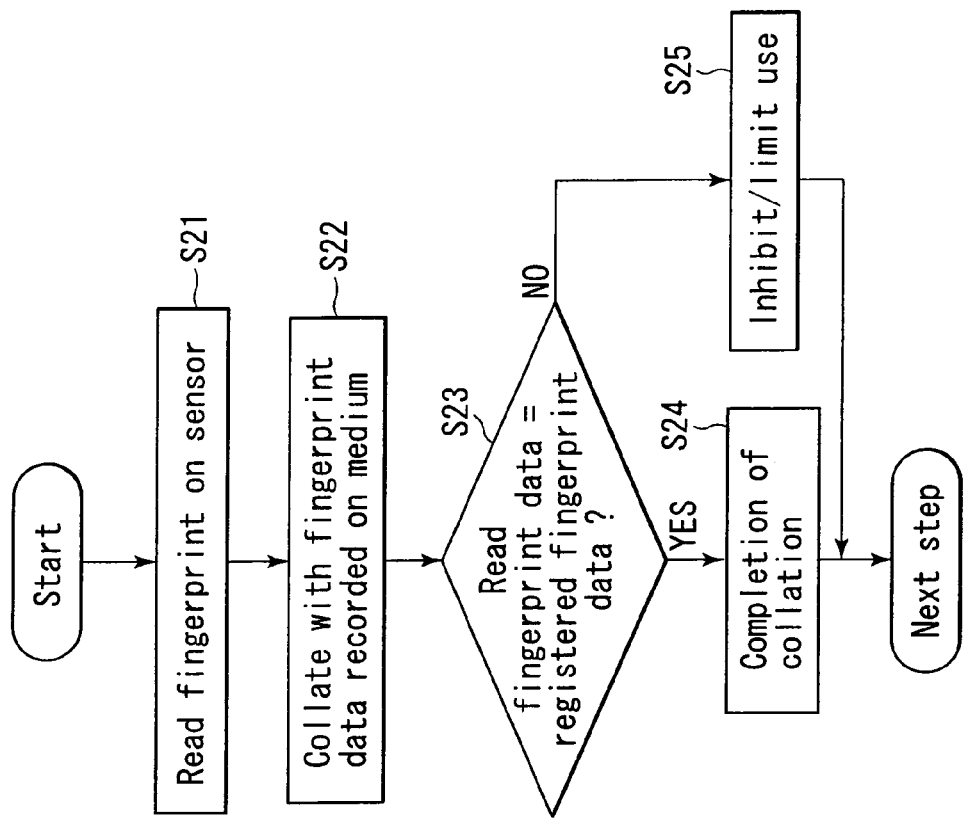
FIG. 6B is a flow chart for explaining fingerprint collation in the information terminal apparatus according to the embodiment.
Figure 6A:
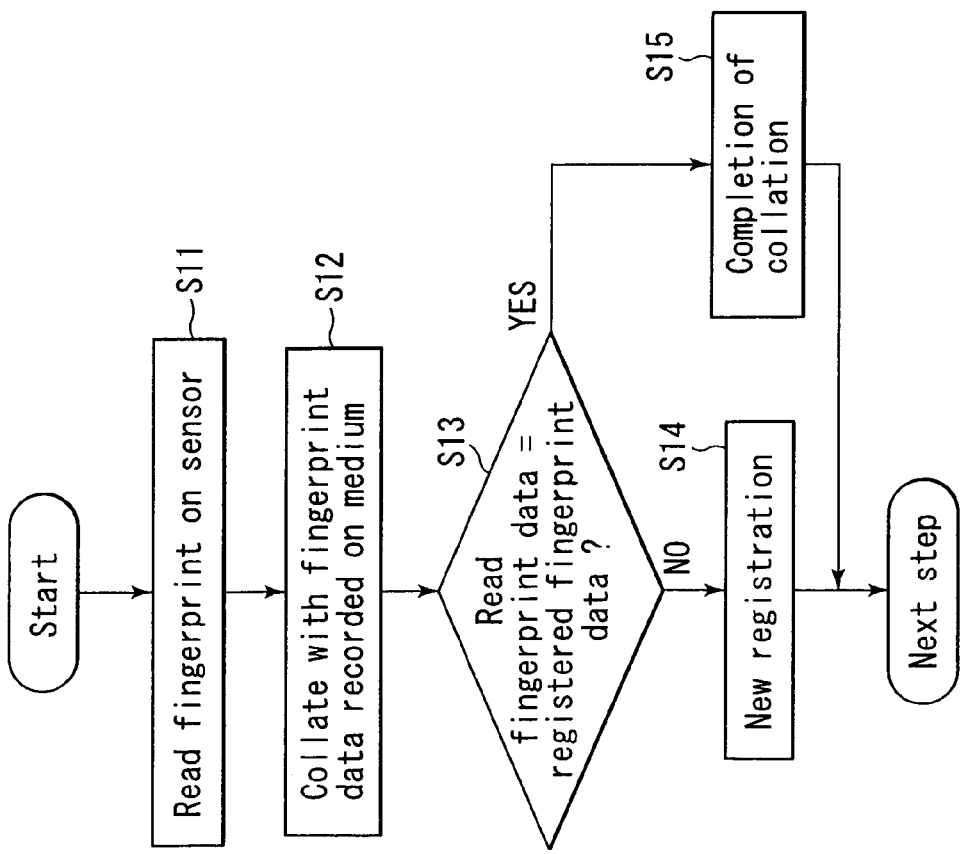
FIG. 6A is a flow chart for explaining fingerprint registration in the information terminal apparatus according to an embodiment.

After that, the processing shifts to step S21 in FIG. 6B. More specifically, the fingerprint of the finger is read by the fingerprint sensor 13. The read fingerprint data is collated with fingerprint data which have already been recorded, and whether the same data exists is determined (steps S21, S22, and S23). If the same fingerprint data exists (YES), collation is completed (step S24), and the processing returns to the original application software or shifts to the next step. If no same fingerprint data has been registered and exists (NO), the use by the user is inhibited or limited (step S25).

In this manner, when the projection (moving frame) of the protection unit is moved while the information terminal apparatus operates (is powered on) and application software runs, the application software is interrupted, fingerprint collation application software starts, and the apparatus shifts to the fingerprint collation mode. If the moving frame of the protection unit returns, the original application software runs again, or the apparatus shifts to the next step.

As has been described in detail above, the present invention can provide an information terminal apparatus capable of preventing damage to a fingerprint sensor caused by external force, inputting handwriting data with a stylus or the like, and activating by simple operation.

What is claimed is:

1. A portable information terminal apparatus comprising:
a pressure sensitive sensor which has a detection surface adapted to be exposed to an outside of the apparatus, reads a fingerprint placed on the detection surface, and generates fingerprint data;
a control unit which collates the fingerprint data generated by the pressure sensitive sensor and permits operation of the portable information terminal apparatus;
a protection unit which comprises a film adapted to cover the detection surface and a frame holding the film, wherein the protection unit is movable between a first position covering the detection surface of the pressure sensitive sensor and a second position exposing the detection surface of the pressure sensitive sensor; and
a moving mechanism which biases the protection unit to the first position to cover the detection surface of the pressure sensitive sensor, wherein the film has a thickness which allows the pressure sensitive sensor to sense pressure applied by a stylus to be sensed through the film.

2. An apparatus according to claim 1, further comprising a movement detection unit which outputs a detection signal when the protection unit has been moved to the second position, and wherein the control unit inhibits and interrupts a current controlling operation to enable another controlling operation when the detection signal is output by the movement detection unit.

3. An apparatus according to claim 1, wherein when the protection unit is at the first position, inputting by handwriting using the stylus is enabled.

4. An apparatus according to claim 1, wherein the film comprises polyester.

5. An apparatus according to claim 1, further comprising a movement detection unit which outputs a detection signal when the protection unit has been moved to the second position, and wherein the control unit activates the apparatus when the detection signal is output from the movement detection unit.

6. An apparatus according to claim 1, wherein the film covers the detection surface of the pressure sensitive sensor entirely.

7. A portable information terminal apparatus comprising:
a pressure sensitive sensor which has a detection surface adapted to be exposed to an outside of the apparatus, reads a fingerprint placed on the detection surface, and generates fingerprint data;
a control unit which collates the fingerprint data generated by the pressure sensitive sensor and permits operation of the portable information terminal apparatus;
a protection unit which includes a cover that is pivotally attached by a hinge to a sensor window from which the detection surface of the pressure sensitive sensor is adapted to be exposed, wherein the protection unit is movable between a first position covering the detection surface of the pressure sensitive sensor and a second position exposing the detection surface of the pressure sensitive sensor; and an opening/closing button which can switch the protection unit between the first position and the second position wherein the cover has a thickness which allows the pressure sensitive sensor to sense pressure applied by a stylus to be sensed through the cover.

8. An apparatus according to claim 7, further comprising a movement detection unit which outputs a detection signal when the protection unit has been moved to the second position, and wherein the control unit inhibits and interrupts a current controlling operation to enable another controlling operation when the detection signal is output by the movement detection unit.

9. An apparatus according to claim 7, wherein when the protection unit is at the first position, inputting by handwriting using the stylus is enabled.

10. An apparatus according to claim 7, wherein the cover comprises polyester.

11. An apparatus according to claim 7, further comprising a movement detection unit which outputs a detection signal when the protection unit has been moved to the second position, and wherein the control unit activates the apparatus when the detection signal is output from the movement detection unit.

12. An apparatus according to claim 7, wherein the cover covers the detection surface of the pressure sensitive sensor entirely.

* * * * *